US011929223B2

(12) United States Patent
Katayama

(10) Patent No.: US 11,929,223 B2
(45) Date of Patent: Mar. 12, 2024

(54) ABNORMALITY DETECTION CIRCUIT AND ABNORMALITY DETECTION METHOD

(71) Applicant: Seiko Epson Corporation, Tokyo (JP)

(72) Inventor: Toshihiko Katayama, Yamagata (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/560,766

(22) Filed: Dec. 23, 2021

(65) Prior Publication Data

US 2022/0208492 A1 Jun. 30, 2022

(30) Foreign Application Priority Data

Dec. 24, 2020 (JP) ................................ 2020-215218

(51) Int. Cl.
*H01H 47/00* (2006.01)
*H01H 47/22* (2006.01)

(52) U.S. Cl.
CPC ........ *H01H 47/002* (2013.01); *H01H 47/223* (2013.01)

(58) Field of Classification Search
CPC .... H01H 47/00; H01H 47/002; H01H 47/004; H01H 47/005; H01H 47/22; H01H 47/223; H01H 47/226; H01H 2047/003; G01R 31/40; G01R 31/42; G01R 31/327; G01R 31/3271; G01R 31/3272; G01R 31/3275; G01R 31/3277; G01R 31/3278; G01R 19/00; G01R 19/0038; G01R 19/0084; H02M 1/32
USPC ......... 361/78, 79, 86, 88–92, 115, 126, 127, 361/160, 170, 179, 180, 187; 323/275–278; 363/34, 37, 44–48, 50–58, 363/74, 125–127
See application file for complete search history.

(56) References Cited

U.S. PATENT DOCUMENTS 9,182,446 B2 * 11/2015 Liu .................... G01R 19/0038
9,751,412 B2 * 9/2017 Im ........................... B60L 53/18

FOREIGN PATENT DOCUMENTS

JP H07-296695 A 11/1995
WO WO-2011065278 A1 * 6/2011 ............. H02J 3/381

OTHER PUBLICATIONS

English translation of WO 2011065278. (Year: 2011).*

* cited by examiner

*Primary Examiner* — Thienvu V Tran
*Assistant Examiner* — Carlos O Rivera-Perez
(74) *Attorney, Agent, or Firm* — Harness, Dickey & Pierce, P.L.C.

(57) ABSTRACT

An abnormality detection circuit includes a first voltage detection circuit to which a voltage is applied from an AC power source when a first relay contact is closed and a second voltage detection circuit to which a voltage is applied from the AC power source when a second relay contact is closed. One end of the first voltage detection circuit is connected to the AC power source via the second wiring line while passing through no other switch. One end of the second voltage detection circuit is connected to the AC power source via the first wiring line while passing through no other switch. Abnormalities of the first and second relay contacts are detected by comparing the voltage applied to a comparative voltage detection circuit with each of the voltages applied to the first and second voltage detection circuits, respectively.

3 Claims, 10 Drawing Sheets

*FIG. 2*
| | ELECTRIC POWER FED TO FIRST RELAY COIL 412 | OUTPUT OF VOLTAGE V1 | ABNORMALITIES OF FIRST RELAY 41 |
|---|---|---|---|
| 1 | YES | YES | NO |
| 2 | NO | NO | NO |
| 3 | YES | NO | YES |
| 4 | NO | YES | YES |
*FIG. 3*
| | ELECTRIC POWER FED TO FIRST RELAY COIL 412 | WAVEFORM OF VOLTAGE V0 / WAVEFORM OF VOLTAGE V1 | PHASE DIFFER-ENCE | DUTY DIFFER-ENCE | ABNORMALITIES OF FIRST RELAY 41 |
|---|---|---|---|---|---|
| 1 | YES | 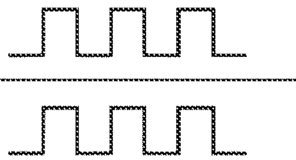 | NO | NO | NO |
| 2 | NO | 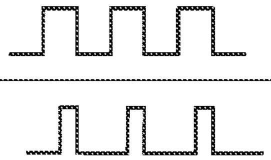 | YES | YES | NO |
| 3 | YES | 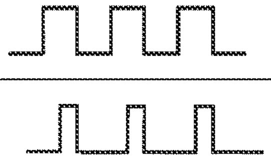 | YES | YES | YES |
| 4 | NO | 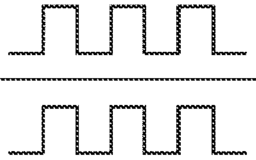 | NO | NO | YES |

FIG. 4
| | ELECTRIC POWER FED TO SECOND RELAY COIL 422 | OUTPUT OF VOLTAGE V2 | ABNORMALITIES OF SECOND RELAY 42 |
|---|---|---|---|
| 1 | YES | YES | NO |
| 2 | NO | NO | NO |
| 3 | YES | NO | YES |
| 4 | NO | YES | YES |
FIG. 5
| | ELECTRIC POWER FED TO SECOND RELAY COIL 422 | WAVEFORM OF VOLTAGE V0<br>WAVEFORM OF VOLTAGE V2 | PHASE DIFFER-ENCE | DUTY DIFFER-ENCE | ABNORMALITIES OF SECOND RELAY 42 |
|---|---|---|---|---|---|
| 1 | YES | 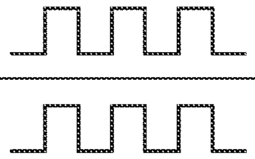 | NO | NO | NO |
| 2 | NO | 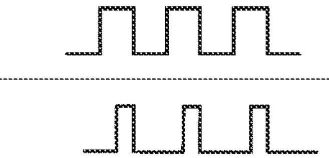 | YES | YES | NO |
| 3 | YES | 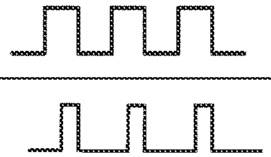 | YES | YES | YES |
| 4 | NO | 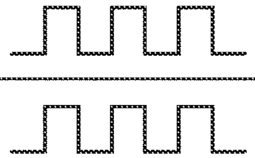 | NO | NO | YES |

| | ELECTRIC POWER FED TO FIRST RELAY COIL 412 | WAVEFORM OF VOLTAGE V0a<br>WAVEFORM OF VOLTAGE V1 | PHASE DIFFER-ENCE | DUTY DIFFER-ENCE | ABNORMALITIES OF FIRST RELAY 41 |
|---|---|---|---|---|---|
| 1 | YES |  | NO | NO | NO |
| 2 | NO |  | YES | YES | NO |
| 3 | YES |  | YES | YES | YES |
| 4 | NO |  | NO | NO | YES |

| | ELECTRIC POWER FED TO SECOND RELAY COIL 422 | WAVEFORM OF VOLTAGE V0b / WAVEFORM OF VOLTAGE V2 | PHASE DIFFER-ENCE | DUTY DIFFER-ENCE | ABNORMALITIES OF SECOND RELAY 42 |
|---|---|---|---|---|---|
| 1 | YES |  | NO | NO | NO |
| 2 | NO |  | YES | YES | NO |
| 3 | YES |  | YES | YES | YES |
| 4 | NO |  | NO | NO | YES |

| | ELECTRIC POWER FED TO SECOND RELAY COIL 422 | WAVEFORM OF VOLTAGE V0 / WAVEFORM OF VOLTAGE V2 | PHASE DIFFER-ENCE | DUTY DIFFER-ENCE | ABNORMALITIES OF SECOND RELAY 42 |
|---|---|---|---|---|---|
| 1 | YES |  | NO | NO | NO |
| 2 | NO |  | YES | YES | NO |
| 3 | YES |  | YES | YES | YES |
| 4 | NO |  | NO | NO | YES |

| | ELECTRIC POWER FED TO SECOND RELAY COIL 422 | ELECTRIC POWER FED TO FIRST RELAY COIL 412 | WAVEFORM OF VOLTAGE V0<br>WAVEFORM OF VOLTAGE V1 | PHASE DIFFER-ENCE | DUTY DIFFER-ENCE | ABNORMALITIES OF FIRST RELAY 41 |
|---|---|---|---|---|---|---|
| 1 | YES | YES |  | NO | NO | NO |
| 2 | YES | NO |  | YES | YES | NO |
| 3 | YES | YES |  | YES | YES | YES |
| 4 | YES | NO |  | NO | NO | YES |

ABNORMALITY DETECTION CIRCUIT AND ABNORMALITY DETECTION METHOD

The present application is based on, and claims priority from JP Application Serial Number 2020-215218, filed Dec. 24, 2020, the disclosure of which is hereby incorporated by reference herein in its entirety.

BACKGROUND

1. Technical Field

The present disclosure relates to an abnormality detection circuit and an abnormality detection method.

2. Related Art

JP-A-7-296695 discloses a relay contact abnormality detection circuit that includes a single photocoupler and can detect a welded contact based on current detected from the photocoupler.

However, a capacitor is coupled to an electrical circuit in many cases in order to reduce noise. In this case, a voltage is applied from the capacitor to the photocoupler also in the state in which the contact is open, and the current flowing through the photocoupler undesirably does not correspond to the open and closed states of the relay. A welded contact may therefore not be detected precisely.

SUMMARY

An abnormality detection circuit according to an aspect of the present disclosure includes an AC power source coupled to a load via a first wiring line and a second wiring line, a first relay contact disposed in a middle of the first wiring line, a second relay contact disposed in a middle of the second wiring line, a comparative voltage detection circuit to which a voltage is applied from the AC power source irrespective of whether the first relay contact and the second relay contact are open or closed, a first voltage detection circuit to which a voltage is applied from the AC power source when the first relay contact is closed, a second voltage detection circuit to which a voltage is applied from the AC power source when the second relay contact is closed, and an abnormality detector that detects abnormalities of the first relay contact by comparing the voltage applied to the comparative voltage detection circuit with the voltage applied to the first voltage detection circuit and detects abnormalities of the second relay contact by comparing the voltage applied to the comparative voltage detection circuit with the voltage applied to the second voltage detection circuit.

An abnormality detection circuit according to another aspect of the present disclosure includes an AC power source coupled to a load via a first wiring line and a second wiring line, a first relay contact disposed in a middle of the first wiring line, a second relay contact disposed in a middle of the second wiring line, a comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the AC power source and to which the same voltage applied to the comparative voltage detection circuit is applied when the first relay contact is closed, a second voltage detection circuit which is coupled to and located between the first wiring line extending from the first relay contact toward the AC power source and the second wiring line extending from the second relay contact toward the load and to which the same voltage applied to the comparative voltage detection circuit is applied when the second relay contact is closed, and an abnormality detector that detects abnormalities of the first relay contact by comparing the voltage applied to the comparative voltage detection circuit with the voltage applied to the first voltage detection circuit and detects abnormalities of the second relay contact by comparing the voltage applied to the comparative voltage detection circuit with the voltage applied to the second voltage detection circuit.

An abnormality detection circuit according to another aspect of the present disclosure includes an AC power source coupled to a load via a first wiring line and a second wiring line, a first relay contact disposed in a middle of the first wiring line, a second relay contact disposed in a middle of the second wiring line, a first comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a second comparative voltage detection circuit which is coupled to and located between the first wiring line extending from the first relay contact toward the AC power source and the second wiring line extending from the second relay contact toward the AC power source, an orientation of the coupled second comparative voltage detection circuit being opposite from an orientation of the coupled first comparative voltage detection circuit, and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the AC power source and to which the same voltage applied to the first comparative voltage detection circuit is applied when the first relay contact is closed, a second voltage detection circuit which is coupled to and located between the first wiring line extending from the first relay contact toward the AC power source and the second wiring line extending from the second relay contact toward the load and to which the same voltage applied to the second comparative voltage detection circuit is applied when the second relay contact is closed, and an abnormality detector that detects abnormalities of the first relay contact by comparing the voltage applied to the first comparative voltage detection circuit with the voltage applied to the first voltage detection circuit and detects abnormalities of the second relay contact by comparing the voltage applied to the second comparative voltage detection circuit with the voltage applied to the second voltage detection circuit.

An abnormality detection circuit according to another aspect of the present disclosure includes an AC power source coupled to a load via a first wiring line and a second wiring line, a first relay contact disposed in a middle of the first wiring line, a second relay contact disposed in a middle of the second wiring line, a comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the load and to which the same voltage applied to the comparative voltage detection circuit is applied when the first relay contact and the second relay contact are closed, a second voltage detection circuit which is coupled to and located between the first wiring line extending from the first relay contact toward the AC power source and the second wiring line extending from the second relay contact toward the load and to which the same voltage applied to the comparative voltage detection circuit is applied when the second relay contact is closed, and an abnormality detector that detects abnormalities of the first relay contact by comparing the voltage applied to the comparative voltage detection circuit with the voltage applied to the first voltage detection circuit and detects abnormalities of the second relay contact by comparing the voltage applied to the comparative voltage detection circuit with the voltage applied to the second voltage detection circuit.

An abnormality detection method according to another aspect of the present disclosure includes providing a circuit including an AC power source coupled to a load via a first wiring line and a second wiring line, a first relay contact disposed in a middle of the first wiring line, and a second relay contact disposed in a middle of the second wiring line with a comparative voltage detection circuit to which a voltage is applied from the AC power source irrespective of whether the first relay contact and the second relay contact are open or closed, a first voltage detection circuit to which a voltage is applied from the AC power source when the first relay contact is closed, and a second voltage detection circuit to which a voltage is applied from the AC power source when the second relay contact is closed, detecting abnormalities of the first relay contact by comparing the voltage applied to the comparative voltage detection circuit with the voltage applied to the first voltage detection circuit, and detecting abnormalities of the second relay contact by comparing the voltage applied to the comparative voltage detection circuit with the voltage applied to the second voltage detection circuit.

An abnormality detection method according to another aspect of the present disclosure includes providing a circuit including an AC power source coupled to a load via a first wiring line and a second wiring line, a first relay contact disposed in a middle of the first wiring line, and a second relay contact disposed in a middle of the second wiring line with a comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the AC power source and to which the same voltage applied to the comparative voltage detection circuit is applied when the first relay contact is closed, and a second voltage detection circuit which is coupled to and located between the first wiring line extending from the first relay contact toward the AC power source and the second wiring line extending from the second relay contact toward the load and to which the same voltage applied to the comparative voltage detection circuit is applied when the second relay contact is closed, detecting abnormalities of the first relay contact by comparing the voltage applied to the comparative voltage detection circuit with the voltage applied to the first voltage detection circuit, and detecting abnormalities of the second relay contact by comparing the voltage applied to the comparative voltage detection circuit with the voltage applied to the second voltage detection circuit.

An abnormality detection method according to another aspect of the present disclosure includes providing a circuit including an AC power source coupled to a load via a first wiring line and a second wiring line, a first relay contact disposed in a middle of the first wiring line, and a second relay contact disposed in a middle of the second wiring line with a first comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a second comparative voltage detection circuit which is coupled to and located between the first wiring line extending from the first relay contact toward the AC power source and the second wiring line extending from the second relay contact toward the AC power source, an orientation of the coupled second comparative voltage detection circuit being opposite from an orientation of the coupled first comparative voltage detection circuit, and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the AC power source and to which the same voltage applied to the first comparative voltage detection circuit is applied when the first relay contact is closed, and a second voltage detection circuit which is coupled to and located between the first wiring line extending from the first relay contact toward the AC power source and the second wiring line extending from the second relay contact toward the load and to which the same voltage applied to the second comparative voltage detection circuit is applied when the second relay contact is closed, detecting abnormalities of the first relay contact by comparing the voltage applied to the first comparative voltage detection circuit with the voltage applied to the first voltage detection circuit, and detecting abnormalities of the second relay contact by comparing the voltage applied to the second comparative voltage detection circuit with the voltage applied to the second voltage detection circuit.

An abnormality detection method according to another aspect of the present disclosure includes providing a circuit including an AC power source coupled to a load via a first wiring line and a second wiring line, a first relay contact disposed in a middle of the first wiring line, and a second relay contact disposed in a middle of the second wiring line with a comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed, a first voltage detection circuit which is coupled to and located between the first wiring line extending from the first relay contact toward the load and the second wiring line extending from the second relay contact toward the load and to which the same voltage applied to the comparative voltage detection circuit is applied when the first relay contact and the second relay contact are closed, and a second voltage detection circuit which is coupled to and located between the first wiring line extending from the first relay contact toward the AC power source and the second wiring line extending from the second relay contact toward the load and to which the same voltage applied to the comparative voltage detection circuit is applied when the second relay contact is closed, detecting abnormalities of the first relay contact by comparing the voltage applied to the comparative voltage detection circuit with the voltage applied to the first voltage detection circuit, and detecting abnormalities of the second relay contact by comparing the voltage applied to the comparative voltage detection circuit with the voltage applied to the second voltage detection circuit.

BRIEF DESCRIPTION OF THE DRAWINGS

FIG. 2 is a table showing a method for detecting abnormalities of a first relay.

FIG. 3 is a table showing the method for detecting abnormalities of the first relay.

FIG. 4 is a table showing a method for detecting abnormalities of a second relay.

FIG. 5 is a table showing the method for detecting abnormalities of the second relay.

DESCRIPTION OF EXEMPLARY EMBODIMENTS

Embodiments will be described below with reference to the drawings.

First Embodiment

Figure 1:
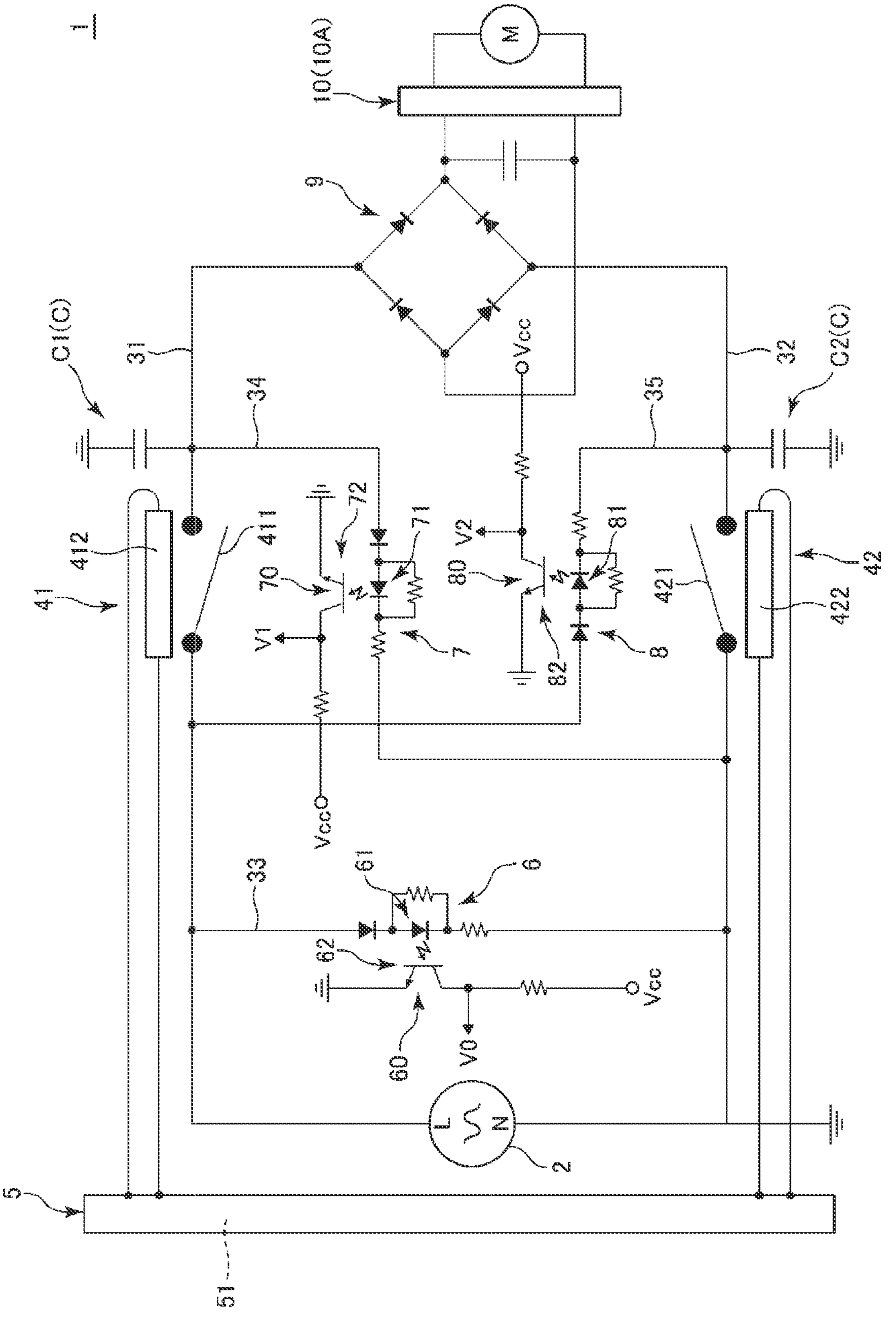
FIG. 1 is a circuit diagram showing an abnormality detection circuit according to a first embodiment.

FIG. 1 is a circuit diagram showing an abnormality detection circuit according to a first embodiment. FIGS. 2 and 3 are tables showing a method for detecting abnormalities of a first relay. FIGS. 4 and 5 are tables showing a method for detecting abnormalities of a second relay.

An abnormality detection circuit 1 shown in FIG. 1 is a circuit capable of detecting abnormalities of a first relay 41 and a second relay 42, which control voltage application to a load 10. The load 10 is not limited to a specific load. In the present embodiment, the load 10 is a motor driving circuit 10A, under the control of which a motor M is driven.

The abnormality detection circuit 1 includes an AC power source 2, which outputs single-phase AC, a bridge diode 9, a first wiring line 31 and a second wiring line 32, which are a pair of wiring lines that couple the AC power source 2 to the bridge diode 9, a first relay 41 disposed in the middle of the first wiring line 31, a second relay 42 disposed in the middle of the second wiring line 32, and a controller 5, under the control of which each portion of the abnormality detection circuit 1 is driven. The single-phase AC outputted from the AC power source 2 is rectified by the bridge diode 9 to substantially smooth DC and then fed to the motor driving circuit 10A. The application of the motor M does not necessarily relate to a specific field, and it is assumed in the present embodiment that the motor M is used, for example, to drive the joints of an industrial robot, such as a SCARA robot, a six-axis multi-joint robot, and a twin-arm robot.

The first relay 41 includes a first relay contact 411 disposed in the middle of the first wiring line 31, and a first relay coil 412 disposed in the vicinity of the first relay contact 411. When electric power is fed to the first relay coil 412, the resultant magnetic action closes the first relay contact 411 and achieves a “closed state”. In contrast, when the electric power fed to the first relay coil 412 is terminated, the magnetic action is lost, and the first relay contact 411 opens and achieves an “open state”. The first relay 41, however, does not necessarily have a specific configuration and may have any configuration that allows the first relay contact 411 to open and close. For example, the first relay 41 may achieve the closed state when electric power is fed to the first relay coil 412 and may achieve the open state when no electric power is fed. A force other than magnetic force may open and close the first relay contact 411.

The second relay 42 has the same configuration as that of the first relay 41. The second relay 42 includes a second relay contact 421 disposed in the middle of the second wiring line 32, and a second relay coil 422 disposed in the vicinity of the second relay contact 421. When electric power is fed to the second relay coil 422, the resultant magnetic action closes the second relay contact 421 and achieves the “closed state”. In contrast, when the electric power fed to the second relay coil 422 is terminated, the magnetic action is lost, and the second relay contact 421 opens and achieves the “open state”. The second relay 42, however, does not necessarily have a specific configuration and may have any configuration that allows the second relay contact 421 to open and close. For example, the second relay 42 may achieve the closed state when electric power is fed to the second relay coil 422 and may achieve the open state when no electric power is fed. A force other than magnetic force may open and close the second relay contact 421.

In the abnormality detection circuit 1, electric power is fed from the AC power source 2 to the motor driving circuit 10A when the first relay 41 and the second relay 42 are both closed, and no electric power is fed from the AC power source 2 to the motor driving circuit 10A when at least one of the first relay 41 and the second relay 42 is open.

The bridge diode 9 is formed of four diodes coupled to each other in the form of a bridge, converts the negative voltage portion of the voltage inputted to the bridge diode 9 into a positive voltage and rectifies the positive voltage into a direct current (pulsating current). The bridge diode then uses electricity storage/discharge performed by a capacitor to smooth the waveform of the direct current so as to convert the smoothed current into a substantially flat direct current.

The abnormality detection circuit 1 further includes a connection wiring line 33, which couples the first wiring line 31 extending from the first relay contact 411 toward the AC power source 2 to the second wiring line 32 extending from the second relay contact 421 toward the AC power source 2, and a comparative voltage detection circuit 6, which is disposed in the middle of the connection wiring line 33.

The comparative voltage detection circuit 6 includes a photocoupler 60 including a light emitting diode 61, which is coupled to and located between the first wiring line 31 and the second wiring line 32, and a phototransistor 62, which receives the light from the light emitting diode 61. In the comparative voltage detection circuit 6, when the light emitting diode 61 emits light, the phototransistor 62 is turned on and outputs a voltage V0. The voltage applied to the light emitting diode 61 can thus be detected. The light emitting diode 61 has an anode facing the first wiring line 31 and a cathode facing the second wiring line 32. The voltage is therefore applied to the light emitting diode 61 when the potential on the first wiring line 31 is higher than that on the second wiring line 32, causing the light emitting diode 61 to emit light.

The abnormality detection circuit 1 further includes a connection wiring line 34, which couples the first wiring line 31 extending from the first relay contact 411 toward the bridge diode 9 to the second wiring line 32 extending from the second relay contact 421 toward the AC power source 2, and a first voltage detection circuit 7, which is disposed in the middle of the connection wiring line 34.

The first voltage detection circuit 7 has the same configuration as that of the comparative voltage detection circuit 6. That is, the first voltage detection circuit 7 includes a photocoupler 70 including a light emitting diode 71, which is coupled to and located between the first wiring line 31 and the second wiring line 32, and a phototransistor 72, which receives the light from the light emitting diode 71. In the first voltage detection circuit 7, when the light emitting diode 71 emits light, the phototransistor 72 is turned on and outputs a voltage V1. The voltage applied to the light emitting diode 71 can thus be detected. The light emitting diode 71 has an anode facing the first wiring line 31 and a cathode facing the second wiring line 32. The voltage is therefore applied to the light emitting diode 71 when the potential on the first wiring line 31 is higher than that on the second wiring line 32, causing the light emitting diode 71 to emit light.

The abnormality detection circuit 1 further includes a connection wiring line 35, which couples the first wiring line 31 extending from the first relay contact 411 toward the AC power source 2 to the second wiring line 32 extending from the second relay contact 421 toward the bridge diode 9, and a second voltage detection circuit 8, which is disposed in the middle of the connection wiring line 35.

The second voltage detection circuit 8 has the same configuration as that of the comparative voltage detection circuit 6. That is, the second voltage detection circuit 8 includes a photocoupler 80 including a light emitting diode 81, which is coupled to and located between the first wiring line 31 and the second wiring line 32, and a phototransistor 82, which receives the light from the light emitting diode 81. In the second voltage detection circuit 8, when the light emitting diode 81 emits light, the phototransistor 82 is turned on and outputs a voltage V2. The voltage applied to the light emitting diode 81 can thus be detected. The light emitting diode 81 has an anode facing the first wiring line 31 and a cathode facing the second wiring line 32. The voltage is therefore applied to the light emitting diode 81 when the potential on the first wiring line 31 is higher than that on the second wiring line 32, causing the light emitting diode 81 to emit light.

The abnormality detection circuit 1 further includes a plurality of capacitors C disposed primarily in order to reduce noise. The number of capacitors C or the arrangement thereof are not limited to a specific number or a specific arrangement and can be set as appropriate in accordance with the purpose of the abnormality detection circuit 1. In FIG. 1, the following capacitors are disposed as the capacitors C: a capacitor C1 coupled to the contact between the first wiring line 31 and the connection wiring line 34; and a capacitor C2 coupled to the contact between the second wiring line 32 and the connection wiring line 35.

Each portion of the abnormality detection circuit 1 is driven under the control of the controller 5. Specifically, the AC power source 2 is driven under the control of the controller 5. The controller 5 further controls whether the first relay 41 is opened or closed by controlling whether electric power is fed or not fed to the first relay coil 412. The controller 5 further controls whether the second relay 42 is opened or closed by controlling whether electric power is fed or not fed to the second relay coil 422. The controller 5 further includes an abnormality detector 51, which detects abnormalities of the first relay 41 and the second relay 42.

The controller 5 is formed, for example, of a computer and includes a processor that processes information, a memory communicably coupled to the processor, and an external interface via which the controller 5 communicates with an external apparatus that is not shown. The memory saves a variety of programs executable by the processor, and the processor reads the variety of programs and other pieces of information stored in the memory and executes the programs.

A description will next be made of how the abnormality detector 51 detects abnormalities of the first relay 41 and the second relay 42. Abnormalities of the first relay 41 refer, for example, to the state in which the first relay contact 41 does not close even when electric power is fed to the first relay coil 412 due, for example, to failure of the contact achieved by the first relay contact 411, or the state in which the first relay contact 41 does not open even when the electric power fed to the first relay coil 412 is terminated, for example, because the first relay contact 411 has been welded. The same applies to abnormalities of the second relay 42.

The detection of abnormalities of the first relay 41 will first be described. When electric power is fed to the first relay coil 412 so that the first relay 41 is closed, a voltage is applied to the light emitting diode 71 from the AC power source 2, and the voltage V1 is outputted from the first voltage detection circuit 7 in response to the light emitted from the light emitting diode 71. In contrast, when the electric power fed to the first relay coil 412 is terminated so that the first relay 41 is opened, a voltage is applied to the light emitting diode 71 as a result of the electricity charging and discharging operation performed by the capacitors C, and the voltage V1 is outputted from the first voltage detection circuit 7 in response to the light emitted from the light emitting diode 71. That is, in the abnormality detection circuit 1, the voltage V1 is outputted from the first voltage detection circuit 7 irrespective of whether the first relay 41 is open or closed. Abnormalities of the first relay 41 cannot therefore be evaluated based on the combination of whether the electric power is fed or not to the first relay coil 412 and whether the voltage V1 is outputted or not, as shown in FIG. 2.

To overcome the problem described above, in the abnormality detection circuit 1, the comparative voltage detection circuit 6 is provided to detect abnormalities of the first relay 41 by comparing the voltage V0 outputted from the comparative voltage detection circuit 6 with the voltage V1 outputted from the first voltage detection circuit 7. In the abnormality detection circuit 1, the voltage is applied to the light emitting diode 61 from the AC power source 2 irrespective of whether the first relay 41 is open or closed, and the voltage V0 according to the applied voltage is outputted from the comparative voltage detection circuit 6. Furthermore, in the abnormality detection circuit 1, the voltage is applied to the light emitting diode 71 irrespective of whether the first relay 41 is open or closed, and the voltage V1 according to the applied voltage is outputted from the first voltage detection circuit 7. The comparative voltage detection circuit 6 and the first voltage detection circuit 7 thus output the voltages V0 and V1 according to the applied voltages, respectively, irrespective of whether the first relay 41 is open or closed.

However, the duty difference and the phase difference between the voltages V0 and V1 change in accordance with whether the first relay 41 is open or closed. When the first relay 41 is closed, the voltage is applied to the light emitting diodes 61 and 71 from the AC power source 2, as shown in FIG. 3. That is, the same voltage is applied to the light emitting diodes 61 and 71. There is therefore no duty difference or phase difference between the voltages V0 and V1. The term "same voltage" described above is not limited to the same voltage, and the meaning of the term includes a case where a slight difference between the voltages may occur depending on the circuit configuration. Similarly, the meaning of the sentence "there is no duty difference or phase difference" described above includes not only the case where the difference is zero but a case where a slight difference between the voltages may occur depending on the circuit configuration. In contrast, when the first relay 41 is open, the voltage is applied to the light emitting diode 61 from the AC power source 2, and the voltage is applied to the light emitting diode 71 as a result of the electricity charging and discharging operation performed by the capacitors C. Therefore, a voltage that is attenuated as compared with the voltage applied to the light emitting diode 61 and out of phase with respect thereto is applied to the light emitting diode 71. There is therefore a duty difference and a phase difference between the voltages V0 and V1.

The abnormality detector 51 therefore detects abnormalities of the first relay 41 based on at least one of the duty difference and the phase difference between the voltages V0 and V1.

In the detection of abnormalities of the first relay 41 based on the phase difference between the voltages V0 and V1, the abnormality detector 51 determines that "the first relay 41 operates normally" when the voltages V0 and V1 are in phase (including a case where the phase difference is smaller than a threshold) with the electric power fed to the first relay coil 412, or when the voltage V0 and V1 have a phase difference greater than or equal to the threshold with no electric power fed to the first relay coil 412. In contrast, the abnormality detector 51 determines that "the first relay 41 operates abnormally" when the voltages V0 and V1 have a phase difference greater than or equal to the threshold with the electric power fed to the first relay coil 412, or when the voltage V0 and V1 are in phase with no electric power fed to the first relay coil 412.

In the detection of abnormalities of the first relay 41 based on the duty difference between the voltages V0 and V1, the abnormality detector 51 determines that "the first relay 41 operates normally" when the voltages V0 and V1 have the same duty (including a case where the duty difference is smaller than a threshold) with the electric power fed to the first relay coil 412, or when the voltage V0 and V1 have a duty difference greater than or equal to the threshold with no electric power fed to the first relay coil 412. In contrast, the abnormality detector 51 determines that "the first relay 41 operates abnormally" when the voltages V0 and V1 have a duty difference greater than or equal to the threshold with the electric power fed to the first relay coil 412, or when the voltage V0 and V1 have the same duty with no electric power fed to the first relay coil 412.

As described above, according to the abnormality detection method based on the duty difference or the phase difference between the voltages V0 and V1, abnormalities of the first relay 41 can be detected precisely even in a circuit in which a voltage is applied to the first voltage detection circuit 7 irrespective of whether the first relay 41 is open or closed.

The detection of abnormalities of the second relay will next be described. The method for detecting abnormalities of the second relay 42 is the same as the aforementioned method for detecting abnormalities of the first relay 41. When the electric power is fed to the second relay coil 422 so that the second relay 42 is closed, the voltage is applied to the light emitting diode 81 from the AC power source 2, and the voltage V2 is outputted from the second voltage detection circuit 8 in response to the light emitted from the light emitting diode 81. In contrast, even when the electric power fed to the second relay coil 422 is terminated so that the second relay 42 is opened, the voltage is applied to the light emitting diode 81 as a result of the electricity charging and discharging operation performed by the capacitors C, and the voltage V2 is outputted from the second voltage detection circuit 8 in response to the light emitted from the light emitting diode 81. That is, in the abnormality detection circuit 1, the voltage V2 is outputted from the second voltage detection circuit 8 irrespective of whether the second relay 42 is open or closed. Abnormalities of the second relay 42 cannot therefore be evaluated based on the combination of whether the electric power is fed or not to the second relay coil 422 and whether the voltage V2 is outputted or not, as shown in FIG. 4.

To overcome the problem described above, in the abnormality detection circuit 1, the comparative voltage detection circuit 6 is provided to detect abnormalities of the second relay 42 by comparing the voltage V0 outputted from the comparative voltage detection circuit 6 with the voltage V2 outputted from the second voltage detection circuit 8. In the abnormality detection circuit 1, the voltage is applied to the light emitting diode 61 from the AC power source 2 irrespective of whether the second relay 42 is open or closed, and the voltage V0 according to the applied voltage is outputted from the comparative voltage detection circuit 6. Furthermore, in the abnormality detection circuit 1, the voltage is applied to the light emitting diode 81 irrespective of whether the second relay 42 is open or closed, and the voltage V2 according to the applied voltage is outputted from the second voltage detection circuit 8. The comparative voltage detection circuit 6 and the second voltage detection circuit 8 thus output the voltages V0 and V2, respectively, irrespective of whether the second relay 42 is open or closed.

However, the duty difference and the phase difference between the voltages V0 and V2 change in accordance with whether the second relay 42 is open or closed. When the second relay 42 is closed, the voltage is applied to the light emitting diodes 61 and 81 from the AC power source 2, as shown in FIG. 5. That is, the same voltage is applied to the light emitting diodes 61 and 81. There is therefore no duty difference or phase difference between the voltages V0 and V2. In contrast, when the second relay 42 is opened, the voltage is applied to the light emitting diode 61 from the AC power source 2, and the voltage is applied to the light emitting diode 81 as a result of the electricity charging and discharging operation performed by the capacitors C. Therefore, a voltage that is attenuated as compared with the voltage applied to the light emitting diode 61 and out of phase with respect thereto is applied to the light emitting diode 81. There is therefore a duty difference and a phase difference between the voltages V0 and V2.

The abnormality detector 51 therefore detects abnormalities of the second relay 42 based on at least one of the duty difference and the phase difference between the voltages V0 and V2.

In the detection of abnormalities of the second relay 42 based on the phase difference between the voltages V0 and V2, the abnormality detector 51 determines that "the second relay 42 operates normally" when the voltages V0 and V2 are in phase (including a case where the phase difference is smaller than a threshold) with the electric power fed to the second relay coil 422, or when the voltage V0 and V2 have a phase difference greater than or equal to the threshold with no electric power fed to the second relay coil 422. In contrast, the abnormality detector 51 determines that "the second relay 42 operates abnormally" when the voltages V0 and V2 have a phase difference greater than or equal to the threshold with the electric power fed to the second relay coil 422, or when the voltage V0 and V2 are in phase with no electric power fed to the second relay coil 422.

In the detection of abnormalities of the second relay 42 based on the duty difference between the voltages V0 and V2, the abnormality detector 51 determines that "the second relay 42 operates normally" when the voltages V0 and V2 have the same duty (including a case where the duty difference is smaller than a threshold) with the electric power fed to the second relay coil 422, or when the voltage V0 and V2 have a duty difference greater than or equal to the threshold with no electric power fed to the second relay coil 422. In contrast, the abnormality detector 51 determines that "the second relay 42 operates abnormally" when the voltages V0 and V2 have a duty difference greater than or equal to the threshold with the electric power fed to the second relay coil 422, or when the voltage V0 and V2 have the same duty with no electric power fed to the second relay coil 422.

As described above, according to the abnormality detection method based on the duty difference or the phase difference between the voltages V0 and V2, abnormalities of the second relay 42 can be detected precisely even in a circuit in which a voltage is applied to the second voltage detection circuit 8 irrespective of whether the second relay 42 is open or closed.

The abnormality detection circuit 1 and the abnormality detection method have been described above. The abnormality detection circuit 1 includes the AC power source 2 coupled to the load 10 via the first wiring line 31 and the second wiring line 32, the first relay contact 411 disposed in the middle of the first wiring line 31, the second relay contact 421 disposed in the middle of the second wiring line 32, the comparative voltage detection circuit 6, to which a voltage is applied from the AC power source 2 irrespective of whether the first relay contact 411 and the second relay contact 421 are open or closed, the first voltage detection circuit 7, to which a voltage is applied from the AC power source 2 when the first relay contact 411 is closed, the second voltage detection circuit 8, to which a voltage is applied from the AC power source 2 when the second relay contact 421 is closed, and the abnormality detector 51, which detects abnormalities of the first relay contact 411 by comparing the voltage applied to the comparative voltage detection circuit 6 with the voltage applied to the first voltage detection circuit 7, and detects abnormalities of the second relay contact 421 by comparing the voltage applied to the comparative voltage detection circuit 6 with the voltage applied to the second voltage detection circuit 8, as described above.

According to the configuration described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

Instead, the abnormality detection circuit 1 includes the AC power source 2, which is coupled to the load 10 via the first wiring line 31 and the second wiring line 32, the first relay contact 411 disposed in the middle of the first wiring line 31, the second relay contact 421 disposed in the middle of the second wiring line 32, the comparative voltage detection circuit 6, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the AC power source 2 and to which the same voltage applied to the comparative voltage detection circuit 6 is applied when the first relay contact 411 is closed, the second voltage detection circuit 8, which is coupled to and located between the first wiring line 31 extending from the first relay contact 411 toward the AC power source 2 and the second wiring line 32 extending from the second relay contact 421 toward the load 10 and to which the same voltage applied to the comparative voltage detection circuit 6 is applied when the second relay contact 421 is closed, and the abnormality detector 51, which detects abnormalities of the first relay contact 411 by comparing the voltage applied to the comparative voltage detection circuit 6 with the voltage applied to the first voltage detection circuit 7 and detects abnormalities of the second relay contact 421 by comparing the voltage applied to the comparative voltage detection circuit 6 with the voltage applied to the second voltage detection circuit 8, as described above.

According to the configuration described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

The abnormality detection method includes providing a circuit including the AC power source 2 coupled to the load 10 via the first wiring line 31 and the second wiring line 32, the first relay contact 411 disposed in the middle of the first wiring line 31, and the second relay contact 421 disposed in the middle of the second wiring line 32 with the comparative voltage detection circuit 6, to which a voltage is applied from the AC power source 2 irrespective of whether the first relay contact 411 and the second relay contact 421 are open or closed, the first voltage detection circuit 7, to which a voltage is applied from the AC power source 2 when the first relay contact 411 is closed, and the second voltage detection circuit 8, to which a voltage is applied from the AC power source 2 when the second relay contact 421 is closed, detecting abnormalities of the first relay contact 411 by comparing the voltage applied to the comparative voltage detection circuit 6 with the voltage applied to the first voltage detection circuit 7, and detecting abnormalities of the second relay contact 421 by comparing the voltage applied to the comparative voltage detection circuit 6 with the voltage applied to the second voltage detection circuit 8.

According to the method described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

Instead, the abnormality detection method includes providing a circuit including the AC power source 2, which is coupled to the load 10 via the first wiring line 31 and the second wiring line 32, the first relay contact 411 disposed in the middle of the first wiring line 31, and the second relay contact 421 disposed in the middle of the second wiring line 32 with the comparative voltage detection circuit 6, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the AC power source 2 and to which the same voltage applied to the comparative voltage detection circuit 6 is applied when the first relay contact 411 is closed, and the second voltage detection circuit 8, which is coupled to and located between the first wiring line 31 extending from the first relay contact 411 toward the AC power source 2 and the second wiring line 32 extending from the second relay contact 421 toward the load 10 and to which the same voltage applied to the comparative voltage detection circuit 6 is applied when the second relay contact 421 is closed, detecting abnormalities of the first relay contact 411 by comparing the voltage applied to the comparative voltage detection circuit 6 with the voltage applied to the first voltage detection circuit 7, and detecting abnormalities of the second relay contact 421 by comparing the voltage applied to the comparative voltage detection circuit 6 with the voltage applied to the second voltage detection circuit 8.

According to the method described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

Second Embodiment

Figure 6:
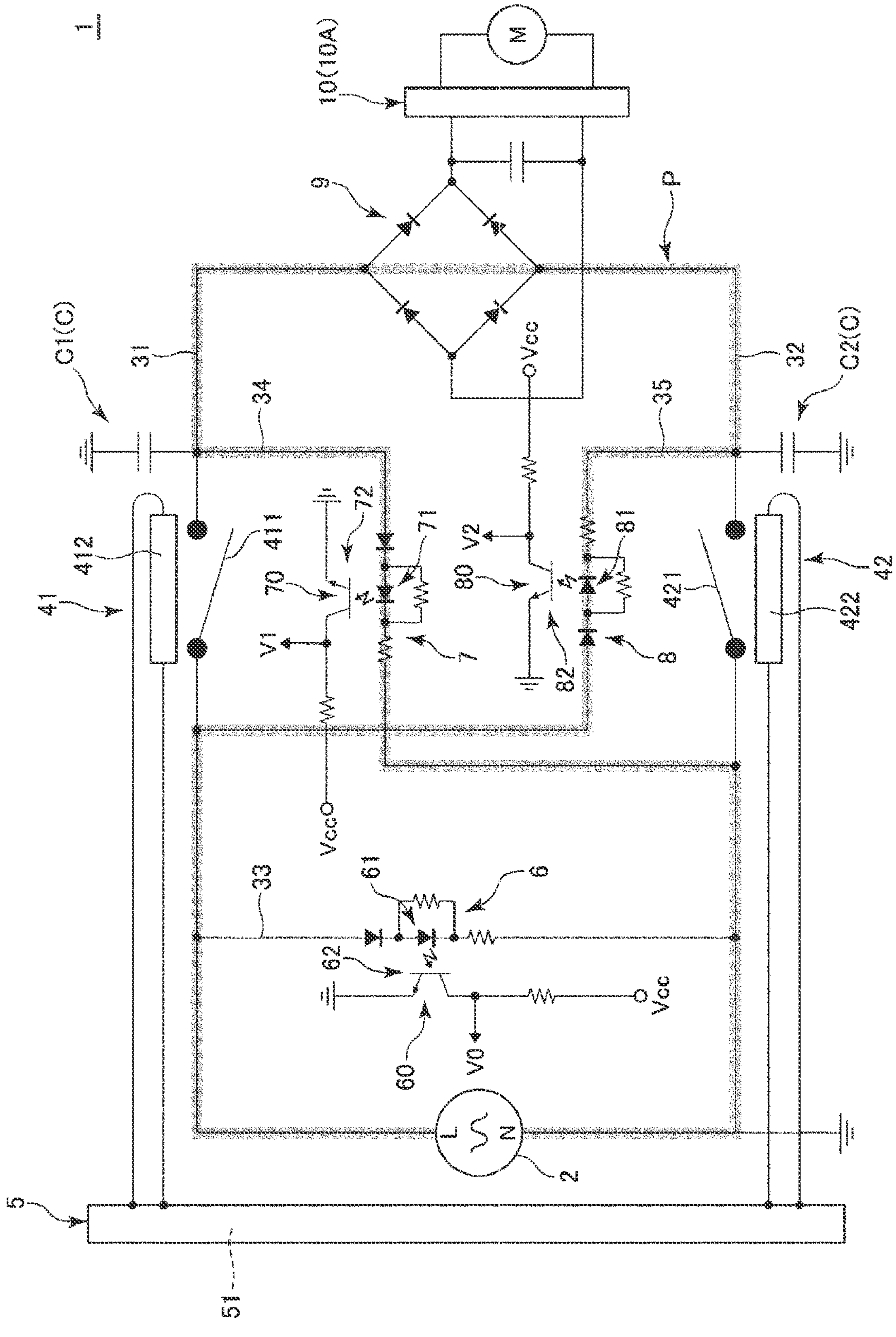
FIG. 6 is a circuit diagram showing a problem with the abnormality detection circuit according to the first embodiment.
Figure 7:
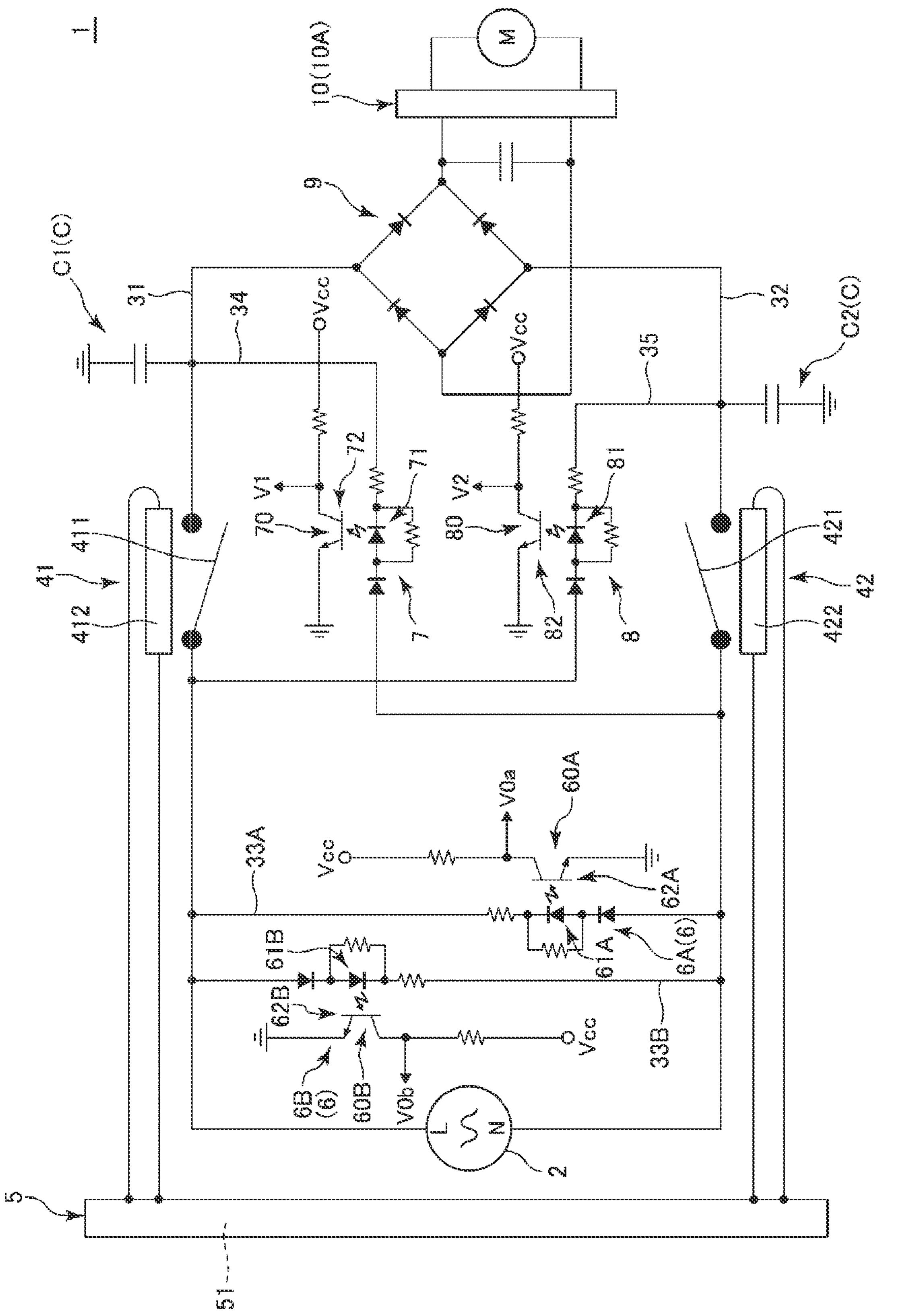
FIG. 7 is a circuit diagram showing the abnormality detection circuit according to a second embodiment.
Figure 8:
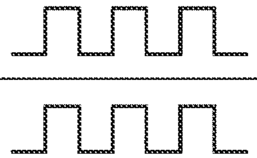
FIG. 8 is a table showing the method for detecting abnormalities of the first relay.
Figure 8:
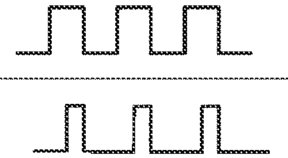
Figure 8:
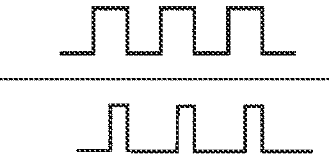
Figure 8:
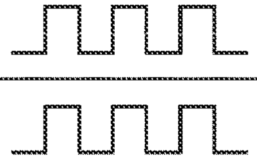
Figure 9:
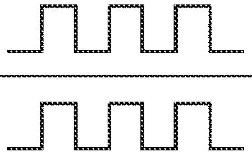
FIG. 9 is a table showing the method for detecting abnormalities of the second relay.
Figure 9:
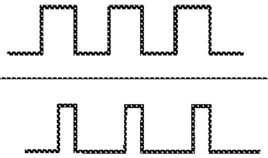
Figure 9:
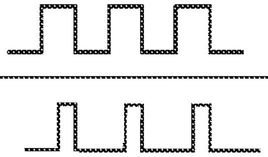
Figure 9:
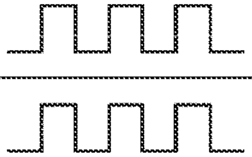

FIG. 6 is a circuit diagram showing a problem with the abnormality detection circuit according to the first embodiment. FIG. 7 is a circuit diagram showing the abnormality detection circuit according to a second embodiment. FIG. 8 is a table showing the method for detecting abnormalities of the first relay. FIG. 9 is a table showing the method for detecting abnormalities of the second relay.

The present embodiment is the same as the first embodiment described above except that the comparative voltage detection circuit 6 and the first voltage detection circuit 7 have different configurations. In the following description, the present embodiment will be described primarily on the difference from the embodiment described above, and the same items will not be described. In FIGS. 6 to 9, the same configurations as those in the embodiment described above have the same reference characters.

In the abnormality detection circuit 1 according to the first embodiment described above, a path P is undesirably formed when the first relay 41 and the second relay 42 are open, as shown in FIG. 6. Although the path P is unlikely to be a major problem because the photocurrent level on the path P is extremely small, it is preferable that no path P is formed. To this end, in the present embodiment, the first voltage detection circuit 7 is disposed in the reversed direction with respect to the direction of the first voltage detection circuit 7 in the first embodiment described above, as shown in FIG. 7. That is, the light emitting diode 71 has an anode facing the second wiring line 32 and a cathode facing the first wiring line 31. The simple configuration described above prevents the formation of the path P.

In the present embodiment, the light emitting diode 71 of the first voltage detection circuit 7 and the light emitting diode 81 of the second voltage detection circuit 8 are oriented in opposite directions. The comparative voltage detection circuit 6 therefore includes a first comparative voltage detection circuit 6A used for the comparison with the first voltage detection circuit 7 and a second comparative voltage detection circuit 6B used for the comparison with the second voltage detection circuit 8.

The first comparative voltage detection circuit 6A includes a photocoupler 60A including a light emitting diode 61A, which is disposed in the middle of a connection wiring line 33A, which couples the first wiring line 31 to the second wiring line 32, and a phototransistor 62A, which receives the light from the light emitting diode 61A. In the thus configured first comparative voltage detection circuit 6A, when the light emitting diode 61A emits light, the phototransistor 62A is turned on and outputs a voltage $V0a$. The voltage applied to the light emitting diode 61A can thus be detected. The light emitting diode 61A has an anode facing the second wiring line 32 and a cathode facing the first wiring line 31. The voltage is therefore applied to the light emitting diode 61A when the potential on the second wiring line 32 is higher than that on the first wiring line 31, causing the light emitting diode 61A to emit light.

The second comparative voltage detection circuit 6B has the same configuration as that of the first comparative voltage detection circuit 6A but is oriented in the opposite direction. That is, the second comparative voltage detection circuit 6B includes a photocoupler 60B including a light emitting diode 61B, which is disposed in the middle of a connection wiring line 33B, which couples the first wiring line 31 to the second wiring line 32, and a phototransistor 62B, which receives the light from the light emitting diode 61B. In the thus configured second comparative voltage detection circuit 6B, when the light emitting diode 61B emits light, the phototransistor 62B is turned on and outputs a voltage V0*b*. The voltage applied to the light emitting diode 61B can thus be detected. The light emitting diode 61B has an anode facing the first wiring line 31 and a cathode facing the second wiring line 32. The voltage is therefore applied to the light emitting diode 61B when the potential on the first wiring line 31 is higher than that on the second wiring line 32, causing the light emitting diode 61B to emit light.

A description will next be made of how the abnormality detector 51 detects abnormalities of the first relay 41 and the second relay 42.

The detection of abnormalities of the first relay 41 will first be described. The abnormality detector 51 detects abnormalities of the first relay 41 by comparing the voltage V0*a* outputted from the first comparative voltage detection circuit 6A with the voltage V1 outputted from the first voltage detection circuit 7, as shown in FIG. 8.

Specifically, the abnormality detector 51 detects abnormalities of the first relay 41 based on at least one of the duty difference and the phase difference between the voltages V0*a* and V1, as in the first embodiment described above.

In the detection of abnormalities of the first relay 41 based on the phase difference between the voltages V0*a* and V1, the abnormality detector 51 determines that "the first relay 41 operates normally" when the voltages V0*a* and V1 are in phase (including a case where the phase difference is smaller than a threshold) with the electric power fed to the first relay coil 412, or when the voltage V0*a* and V1 have a phase difference greater than or equal to the threshold with no electric power fed to the first relay coil 412. In contrast, the abnormality detector 51 determines that "the first relay 41 operates abnormally" when the voltages V0*a* and V1 have a phase difference greater than or equal to the threshold with the electric power fed to the first relay coil 412, or when the voltage V0*a* and V1 are in phase with no electric power fed to the first relay coil 412.

In the detection of abnormalities of the first relay 41 based on the duty difference between the voltages V0*a* and V1, the abnormality detector 51 determines that "the first relay 41 operates normally" when the voltages V0*a* and V1 have the same duty (including a case where the duty difference is smaller than a threshold) with the electric power fed to the first relay coil 412, or when the voltage V0*a* and V1 have a duty difference greater than or equal to the threshold with no electric power fed to the first relay coil 412. In contrast, the abnormality detector 51 determines that "the first relay 41 operates abnormally" when the voltages V0*a* and V1 have a duty difference greater than or equal to the threshold with the electric power fed to the first relay coil 412, or when the voltage V0*a* and V1 have the same duty with no electric power fed to the first relay coil 412.

As described above, according to the abnormality detection method based on the duty difference or the phase difference between the voltages V0*a* and V1, abnormalities of the first relay 41 can be detected precisely even in a circuit in which a voltage is applied to the first voltage detection circuit 7 irrespective of whether the first relay 41 is open or closed.

The detection of abnormalities of the second relay 42 will next be described. The abnormality detector 51 detects abnormalities of the second relay 42 based on at least one of the duty difference and the phase difference between the voltages V0*b* and V2, as shown in FIG. 9.

In the detection of abnormalities of the second relay 42 based on the phase difference between the voltages V0*b* and V2, the abnormality detector 51 determines that "the second relay 42 operates normally" when the voltages V0*b* and V2 are in phase (including a case where the phase difference is smaller than a threshold) with the electric power fed to the second relay coil 422, or when the voltage V0*b* and V2 have a phase difference greater than or equal to the threshold with no electric power fed to the second relay coil 422. In contrast, the abnormality detector 51 determines that "the second relay 42 operates abnormally" when the voltages V0*b* and V2 have a phase difference greater than or equal to the threshold with the electric power fed to the second relay coil 422, or when the voltage V0*b* and V2 are in phase with no electric power fed to the second relay coil 422.

In the detection of abnormalities of the second relay 42 based on the duty difference between the voltages V0*b* and V2, the abnormality detector 51 determines that "the second relay 42 operates normally" when the voltages V0*b* and V2 have the same duty (including a case where the duty difference is smaller than a threshold) with the electric power fed to the second relay coil 422, or when the voltage V0*b* and V2 have a duty difference greater than or equal to the threshold with no electric power fed to the second relay coil 422. In contrast, the abnormality detector 51 determines that "the second relay 42 operates abnormally" when the voltages V0*b* and V2 have a duty difference greater than or equal to the threshold with the electric power fed to the second relay coil 422, or when the voltage V0*b* and V2 have the same duty with no electric power fed to the second relay coil 422.

As described above, according to the abnormality detection method based on the duty difference or the phase difference between the voltages V0*b* and V2, abnormalities of the second relay 42 can be detected precisely even in a circuit in which a voltage is applied to the second voltage detection circuit 8 irrespective of whether the second relay 42 is open or closed.

The abnormality detection circuit 1 and the abnormality detection method have been described above. The abnormality detection circuit 1 includes the AC power source 2, which is coupled to the load 10 via the first wiring line 31 and the second wiring line 32, the first relay contact 411 disposed in the middle of the first wiring line 31, the second relay contact 421 disposed in the middle of the second wiring line 32, the first comparative voltage detection circuit 6A, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the second comparative voltage detection circuit 6B, which is coupled to and located between the first wiring line 31 extending from the first relay contact 411 toward the AC power source 2 and the second wiring line 32 extending from the second relay contact 421 toward the AC power source 2, the orientation of the coupled second comparative voltage detection circuit 6B being opposite from the orientation of the coupled first comparative voltage detection circuit 6A, and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the AC power source and to which the same voltage applied to the first comparative voltage detection circuit 6A is applied when the first relay contact 411 is closed, the second voltage detection circuit 8, which is coupled to and located between the first wiring line 31 extending from the first relay contact 411 toward the AC power source 2 and the second wiring line 32 extending from the second relay contact 421 toward the load and to which the same voltage applied to the second comparative voltage detection circuit 6B is applied when the second relay contact 421 is closed, and the abnormality detector 51, which detects abnormalities of the first relay contact 411 by comparing the voltage applied to the first comparative voltage detection circuit 6A with the voltage applied to the first voltage detection circuit 7 and detects abnormalities of the second relay contact 421 by comparing the voltage applied to the second comparative voltage detection circuit 6B with the voltage applied to the second voltage detection circuit 8, as described above.

According to the configuration described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

The abnormality detection method includes providing a circuit including the AC power source 2, which is coupled to the load 10 via the first wiring line 31 and the second wiring line 32, the first relay contact 411 disposed in the middle of the first wiring line 31, and the second relay contact 421 disposed in the middle of the second wiring line 32 with the first comparative voltage detection circuit 6A, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the second comparative voltage detection circuit 6B, which is coupled to and located between the first wiring line 31 extending from the first relay contact 411 toward the AC power source 2 and the second wiring line 32 extending from the second relay contact 421 toward the AC power source 2, the orientation of the coupled second comparative voltage detection circuit 6B being opposite from the orientation of the coupled first comparative voltage detection circuit 6A, and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the AC power source and to which the same voltage applied to the first comparative voltage detection circuit 6A is applied when the first relay contact 411 is closed, and the second voltage detection circuit 8, which is coupled to and located between the first wiring line 31 extending from the first relay contact 411 toward the AC power source 2 and the second wiring line 32 extending from the second relay contact 421 toward the load and to which the same voltage applied to the second comparative voltage detection circuit 6B is applied when the second relay contact 421 is closed, detecting abnormalities of the first relay contact 411 by comparing the voltage applied to the first comparative voltage detection circuit 6A with the voltage applied to the first voltage detection circuit 7, and detecting abnormalities of the second relay contact 421 by comparing the voltage applied to the second comparative voltage detection circuit 6B with the voltage applied to the second voltage detection circuit 8.

According to the method described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

The thus configured second embodiment can also provide the same effects as those provided by the first embodiment described above.

Third Embodiment

Figure 10:
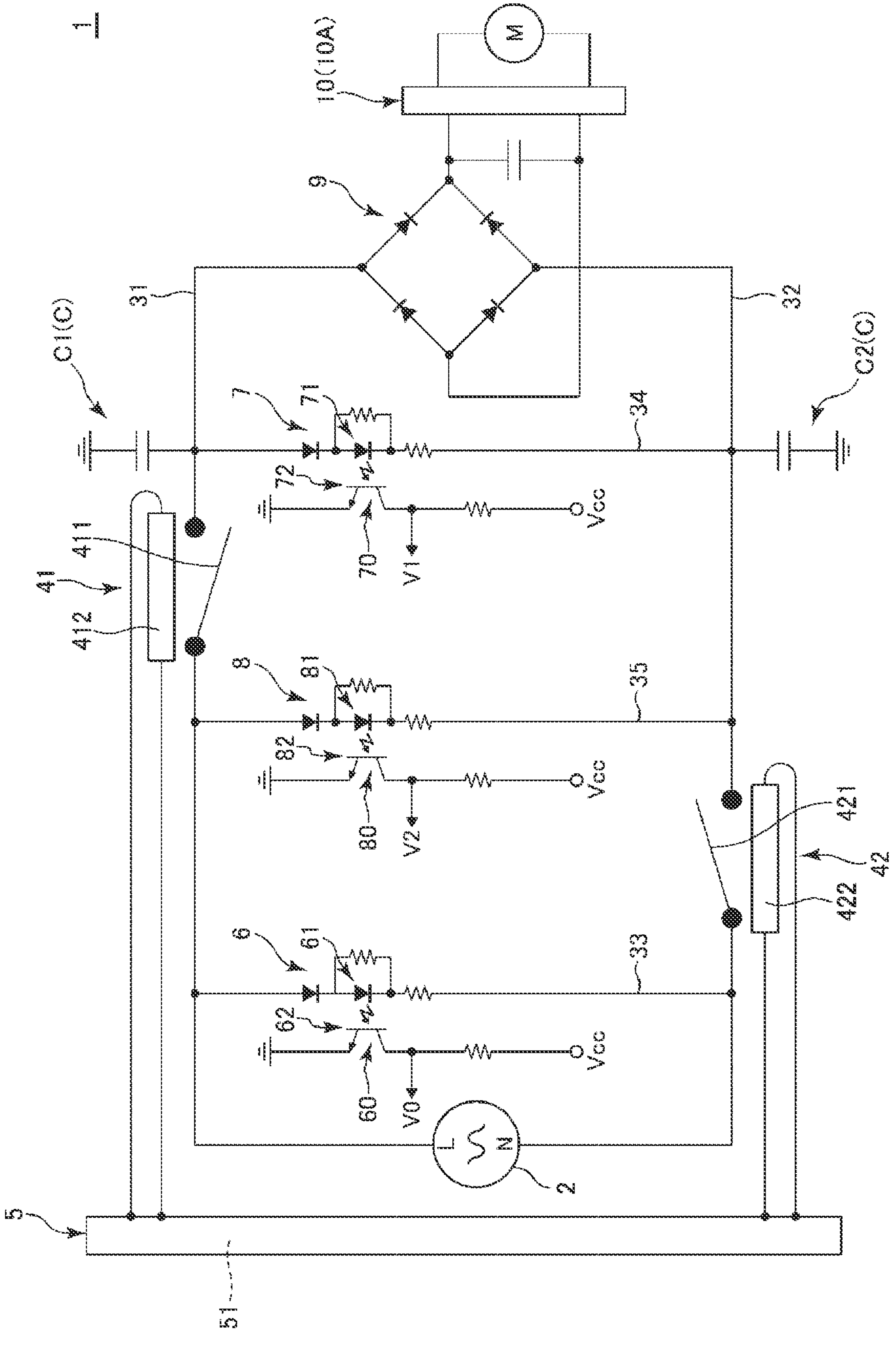
FIG. 10 is a circuit diagram showing the abnormality detection circuit according to a third embodiment.
Figure 11:
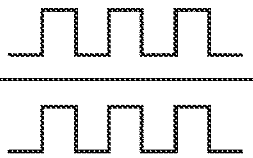
FIG. 11 is a table showing the method for detecting abnormalities of the first relay.
Figure 11:
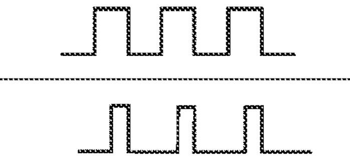
Figure 11:
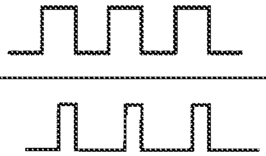
Figure 11:
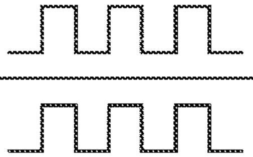
Figure 12:
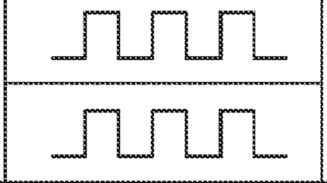
FIG. 12 is a table showing the method for detecting abnormalities of the second relay.
Figure 12:
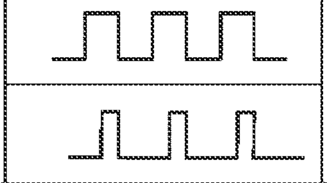
Figure 12:
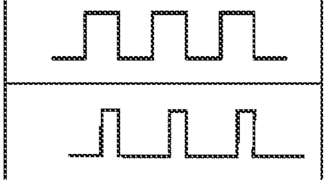
Figure 12:
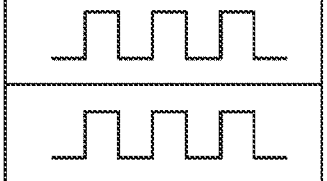

FIG. 10 is a circuit diagram showing the abnormality detection circuit according to a third embodiment. FIG. 11 is a table showing the method for detecting abnormalities of the first relay. FIG. 12 is a table showing the method for detecting abnormalities of the second relay.

The present embodiment is the same as the first embodiment described above except that the first voltage detection circuit 7 is disposed differently. In the following description, the present embodiment will be described primarily on the difference from the embodiments described above, and the same items will not be described. In FIGS. 10 to 12, the same configurations as those in the embodiments described above have the same reference characters.

In the abnormality detection circuit 1 shown in FIG. 10, the first voltage detection circuit 7 is coupled to and located between the first wiring line 31 downstream from the first relay contact 411 and the second wiring line 32 downstream from the second relay contact 421. In the thus configured abnormality detection circuit 1, abnormalities of the first relay 41 and the second relay 42 are detected as follows.

The detection of abnormalities of the second relay will first be described. The abnormality detector 51 detects abnormalities of the second relay 42 based on at least one of the duty difference and the phase difference between the voltages V0 and V2, as shown in FIG. 11.

In the detection of abnormalities of the second relay 42 based on the phase difference between the voltages V0 and V2, the abnormality detector 51 determines that "the second relay 42 operates normally" when the voltages V0 and V2 are in phase (including a case where the phase difference is smaller than a threshold) with the electric power fed to the second relay coil 422, or when the voltage V0 and V2 have a phase difference greater than or equal to the threshold with no electric power fed to the second relay coil 422. In contrast, the abnormality detector 51 determines that "the second relay 42 operates abnormally" when the voltages V0 and V2 have a phase difference greater than or equal to the threshold with the electric power fed to the second relay coil 422, or when the voltage V0 and V2 are in phase with no electric power fed to the second relay coil 422.

In the detection of abnormalities of the second relay 42 based on the duty difference between the voltages V0 and V2, the abnormality detector 51 determines that "the second relay 42 operates normally" when the voltages V0 and V2 have the same duty (including a case where the duty difference is smaller than a threshold) with the electric power fed to the second relay coil 422, or when the voltage V0 and V2 have a duty difference greater than or equal to the threshold with no electric power fed to the second relay coil 422. In contrast, the abnormality detector 51 determines that "the second relay 42 operates abnormally" when the voltages V0 and V2 have a duty difference greater than or equal to the threshold with the electric power fed to the second relay coil 422, or when the voltage V0 and V2 have the same duty with no electric power fed to the second relay coil 422.

As described above, according to the abnormality detection method based on the duty difference or the phase difference between the voltages V0 and V2, abnormalities of the second relay 42 can be detected precisely even in a circuit in which a voltage is applied to the second voltage detection circuit 8 irrespective of whether the second relay 42 is open or closed.

The detection of abnormalities of the first relay 41 will next be described. The detection of abnormalities of the first relay 41 is performed with the second relay 42 being closed after it is ascertained that the second relay 42 operates normally. The abnormality detector 51 detects abnormalities of the first relay 41 based on at least one of the duty difference and the phase difference between the voltages V0 and V1, as shown in FIG. 12.

In the detection of abnormalities of the first relay 41 based on the phase difference between the voltages V0 and V1, the abnormality detector 51 determines that "the first relay 41 operates normally" when the voltages V0 and V1 are in phase (including a case where the phase difference is smaller than a threshold) with the electric power fed to the first relay coil 412, or when the voltage V0 and V1 have a phase difference greater than or equal to the threshold with no electric power fed to the first relay coil 412. In contrast, the abnormality detector 51 determines that "the first relay 41 operates abnormally" when the voltages V0 and V1 have a phase difference greater than or equal to the threshold with the electric power fed to the first relay coil 412, or when the voltage V0 and V1 are in phase with no electric power fed to the first relay coil 412.

In the detection of abnormalities of the first relay 41 based on the duty difference between the voltages V0 and V1, the abnormality detector 51 determines that "the first relay 41 operates normally" when the voltages V0 and V1 have the same duty (including a case where the duty difference is smaller than a threshold) with the electric power fed to the first relay coil 412, or when the voltage V0 and V1 have a duty difference greater than or equal to the threshold with no electric power fed to the first relay coil 412. In contrast, the abnormality detector 51 determines that "the first relay 41 operates abnormally" when the voltages V0 and V1 have a duty difference greater than or equal to the threshold with the electric power fed to the first relay coil 412, or when the voltage V0 and V1 have the same duty with no electric power fed to the first relay coil 412.

As described above, according to the abnormality detection method based on the duty difference or the phase difference between the voltages V0 and V1, abnormalities of the first relay 41 can be detected precisely even in a circuit in which a voltage is applied to the first voltage detection circuit 7 irrespective of whether the first relay 41 is open or closed.

The abnormality detection circuit 1 and the abnormality detection method have been described above. The abnormality detection circuit 1 includes the AC power source 2, which is coupled to the load 10 via the first wiring line 31 and the second wiring line 32, the first relay contact 411 disposed in the middle of the first wiring line 31, the second relay contact 421 disposed in the middle of the second wiring line 32, the comparative voltage detection circuit 6, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the load 10 and to which the same voltage applied to the comparative voltage detection circuit 6 is applied when the first relay contact 411 and the second relay contact 421 are closed, the second voltage detection circuit 8, which is coupled to and located between the first wiring line 31 extending from the first relay contact 411 toward the AC power source 2 and the second wiring line 32 extending from the second relay contact 421 toward the load 10 and to which the same voltage applied to the comparative voltage detection circuit 6 is applied when the second relay contact 421 is closed, and the abnormality detector 51, which detects abnormalities of the first relay contact 411 by comparing the voltage applied to the comparative voltage detection circuit 6 with the voltage applied to the first voltage detection circuit 7 and detects abnormalities of the second relay contact 421 by comparing the voltage applied to the comparative voltage detection circuit 6 with the voltage applied to the second voltage detection circuit 8, as described above.

According to the configuration described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

The abnormality detection method includes providing a circuit including the AC power source 2, which is coupled to the load 10 via the first wiring line 31 and the second wiring line 32, the first relay contact 411 disposed in the middle of the first wiring line 31, and the second relay contact 421 disposed in the middle of the second wiring line 32 with the comparative voltage detection circuit 6, which is coupled to and located between the first wiring line 31 extending from the first relay contact 411 toward the AC power source 2 and the second wiring line 32 extending from the second relay contact 421 toward the AC power source 2 and to which a voltage is applied from the AC power source 2 irrespective of whether the first relay contact 411 and the second relay contact 421 are open or closed, the first voltage detection circuit 7, which is coupled to and located between the first wiring line 31 extending from the first relay contact 411 toward the load 10 and the second wiring line 32 extending from the second relay contact 421 toward the load 10 and to which the same voltage applied to the comparative voltage detection circuit 6 is applied when the first relay contact 411 and the second relay contact 421 are closed, and the second voltage detection circuit 8, which is coupled to and located between the first wiring line 31 extending from the first relay contact 411 toward the AC power source 2 and the second wiring line 32 extending from the second relay contact 421 toward the load 10 and to which the same voltage applied to the comparative voltage detection circuit 6 is applied when the second relay contact 421 is closed, detecting abnormalities of the first relay contact 411 by comparing the voltage applied to the comparative voltage detection circuit 6 with the voltage applied to the first voltage detection circuit 7, and detecting abnormalities of the second relay contact 421 by comparing the voltage applied to the comparative voltage detection circuit 6 with the voltage applied to the second voltage detection circuit 8, as described above.

According to the method described above, abnormalities of the first relay contact 411 can be detected precisely even in a circuit in which a voltage is applied to the first voltage detection circuit 7 irrespective of whether the first relay 41 is open or closed. Abnormalities of the second relay contact 421 can also be detected precisely even in a circuit in which a voltage is applied to the second voltage detection circuit 8 irrespective of whether the second relay 42 is open or closed.

The thus configured third embodiment can also provide the same effects as those provided by the first embodiment described above.

The abnormality detection circuit and the abnormality detection method according to the present disclosure have been described above based on the illustrated embodiments, but the present disclosure is not limited thereto, and the configuration of each portion can be replaced with an arbitrary configuration having the same function. Further, another arbitrary constituent element may be added to any of the embodiments of the present disclosure.

What is claimed is:

1. An abnormality detection circuit comprising:

an AC power source coupled to a load via a first wiring line and a second wiring line;

a first relay contact disposed in a middle of the first wiring line;

a second relay contact disposed in a middle of the second wiring line;

a first comparative voltage detection circuit to which a voltage is applied from the AC power source irrespective of whether the first relay contact and the second relay contact are open or closed, both ends of the first comparative voltage detection circuit being connected to the first and second wiring lines, respectively;

a second comparative voltage detection circuit to which a voltage is applied from the AC power source irrespective of whether the first relay contact and the second relay contact are open or closed, both ends of the second comparative voltage detection circuit being connected to the first and second wiring lines, respectively;

a first voltage detection circuit to which a voltage is applied from the AC power source when the first relay contact is closed, one end of the first voltage detection circuit being connected to the AC power source via the second wiring line while passing through no other switch;

a second voltage detection circuit to which a voltage is applied from the AC power source when the second relay contact is closed, one end of the second voltage detection circuit being connected to the AC power source via the first wiring line while passing through no other switch; and an abnormality detector that detects abnormalities of the first relay contact by comparing the voltage applied to the first comparative voltage detection circuit with the voltage applied to the first voltage detection circuit and detects abnormalities of the second relay contact by comparing the voltage applied to the second comparative voltage detection circuit with the voltage applied to the second voltage detection circuit.

2. An abnormality detection circuit comprising:

an AC power source coupled to a load via a first wiring line and a second wiring line;

a first relay contact disposed in a middle of the first wiring line;

a second relay contact disposed in a middle of the second wiring line;

a first comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed;

a second comparative voltage detection circuit which is coupled to and located between the first wiring line extending from the first relay contact toward the AC power source and the second wiring line extending from the second relay contact toward the AC power source and to which a voltage is applied from the AC power source irrespective of whether the first relay contact and the second relay contact are open or closed;

a first voltage detection circuit which is coupled to and located between the first wiring line extending from the first relay contact toward the load and the second wiring line extending from the second relay contact toward the AC power source and to which the same voltage applied to the first comparative voltage detection circuit is applied when the first relay contact is closed, wherein the second wiring line extending from the second relay contact is connected to the AC power source while passing through no other switch;

a second voltage detection circuit which is coupled to and located between the first wiring line extending from the first relay contact toward the AC power source and the second wiring line extending from the second relay contact toward the load and to which the same voltage applied to the second comparative voltage detection circuit is applied when the second relay contact is closed, wherein the first wiring line extending from the first relay contact is connected to the AC power source while passing through no other switch; and an abnormality detector that detects abnormalities of the first relay contact by comparing the voltage applied to the first comparative voltage detection circuit with the voltage applied to the first voltage detection circuit and detects abnormalities of the second relay contact by comparing the voltage applied to the second comparative voltage detection circuit with the voltage applied to the second voltage detection circuit.

3. An abnormality detection method of a circuit, the circuit including:

an AC power source coupled to a load via a first wiring line and a second wiring line;

a first relay contact disposed in a middle of the first wiring line;

a second relay contact disposed in a middle of the second wiring line;

a first comparative voltage detection circuit to which a voltage is applied from the AC power source irrespective of whether the first relay contact and the second relay contact are open or closed, both ends of the first comparative voltage detection circuit being connected to the first and second wiring lines, respectively;

a second comparative voltage detection circuit to which a voltage is applied from the AC power source irrespective of whether the first relay contact and the second relay contact are open or closed, both ends of the second comparative voltage detection circuit being connected to the first and second wiring lines, respectively;

a first voltage detection circuit to which a voltage is applied from the AC power source when the first relay contact is closed, one end of the first voltage detection circuit being connected to the AC power source via the second wiring line while passing through no other switch;

a second voltage detection circuit to which a voltage is applied from the AC power source when the second relay contact is closed, one end of the second voltage detection circuit being connected to the AC power source via the first wiring line while passing through no other switch, the abnormality detection method comprising:

detecting abnormalities of the first relay contact by comparing the voltage applied to the first comparative voltage detection circuit with the voltage applied to the first voltage detection circuit; and detecting abnormalities of the second relay contact by comparing the voltage applied to the second comparative voltage detection circuit with the voltage applied to the second voltage detection circuit.

* * * * *